United States Patent [19]

Jang

[11] Patent Number: 5,757,953

[45] Date of Patent: May 26, 1998

[54] AUTOMATED METHOD AND SYSTEM FOR REGION DECOMPOSITION IN DIGITAL RADIOGRAPHIC IMAGES

[75] Inventor: Ben K. Jang, Rochester, N.Y.

[73] Assignee: Eastman Kodak Company, Rochester, N.Y.

[21] Appl. No.: 608,899

[22] Filed: Feb. 29, 1996

[51] Int. Cl.$^6$ ................................................. G06K 9/00
[52] U.S. Cl. ...................... 382/132; 382/173; 382/257; 382/264; 382/308
[58] Field of Search ............................. 382/132, 133, 382/130, 173, 180, 192, 224, 225, 257, 260, 264, 308, 299

[56] References Cited

U.S. PATENT DOCUMENTS

| | | | |
|---|---|---|---|
| 4,644,585 | 2/1987 | Crimmins et al. | 382/257 |
| 4,731,863 | 3/1988 | Sezan et al. | 382/172 |
| 4,952,805 | 8/1990 | Tanaka | 250/327.2 |
| 5,268,967 | 12/1993 | Jang et al. | 382/132 |
| 5,598,481 | 1/1997 | Nishikawa et al. | 382/130 |

OTHER PUBLICATIONS

"A Survey on Image Segmentation" by K.S. Fu and J.K. Mui. Pattern Recognition, vol. 13, pp. 3–16. Pergamon Press Ltd., 1981.

"Modeling and Segmentation of Noisy and Textured Images Using Gibbs Random Fields" by Haluk Derin and Howard Elliott. IEEE Transactions on Pattern Analysis and Machine Intelligence, vol. PAMI-9, No. 1, Jan. 1987.

"Scale space filtering: a new approach to multi-scale description" by Andrew P. Witkin. From the book, Image Understanding 1984, S. Ullman and W. Richards, Eds., Norwood, NJ, 1984.

"Decomposition of Polygons into Convex Sets" by Bruce Schachter. IEEE Transactions on Computers, vol. C-27, No. 11, Nov. 1978, pp. 1078–1082.

"A parallel algorithm for decomposition of binary objects through skeletonization" by S.K. Parui. Pattern Recognition Letters 12 (1991), Apr. 1991.

"Scale–Space and Edge Detection Using Anisotropic Diffusion" by Pietro Perona and Jitendra Malik. IEEE Trasnactions on Pattern Analysis and Machine Intelligence, vol. 12, No. 7, Jul. 1990, pp. 629–639.

"Effective Algorithms for the Nearest Neighbor Method in the Clustering Problem" by Kazuo Hattori and Yasunobu Torii. Pattern Recognition, vol. 26, No. 5, pp. 741–746, 1993.

"Image Analysis Using Mathematical Morphology" by Robert M. Haralick, Stanley R. Sternberg and Xinhua Zhuang. IEEE Transactions on Pattern Analysis and Machine Intelligence, vol. PAMI-9, No. 4, Jul. 1987, pp. 532–550.

*Primary Examiner*—Leo Boudreau
*Assistant Examiner*—Phuoc Tran
*Attorney, Agent, or Firm*—David M. Woods

[57] ABSTRACT

A digital radiographic image is segmented into various regions and a region thereof is further decomposed into subregions, wherein digital image data is acquired and subjected to multiple phases of digital imaging processes. The region decomposition method first uses progressively smoothing techniques to generate smoothed regions at multiple scales. Next, the number of connected components at each scale is computed for each smoothed region. A shape spectrum, which is the number of connected components as a function of scale, is subsequently constructed to determine the most stable range of scales and the most stable number of subregions into which the region is decomposed. Each pixel is then classified into subregions, according to the geometrical relationship of the connected components detected at most stable scales. Finally, a decomposed map is generated to function as multivalued templates for any further image processing to be done on various decomposed subregions.

15 Claims, 7 Drawing Sheets

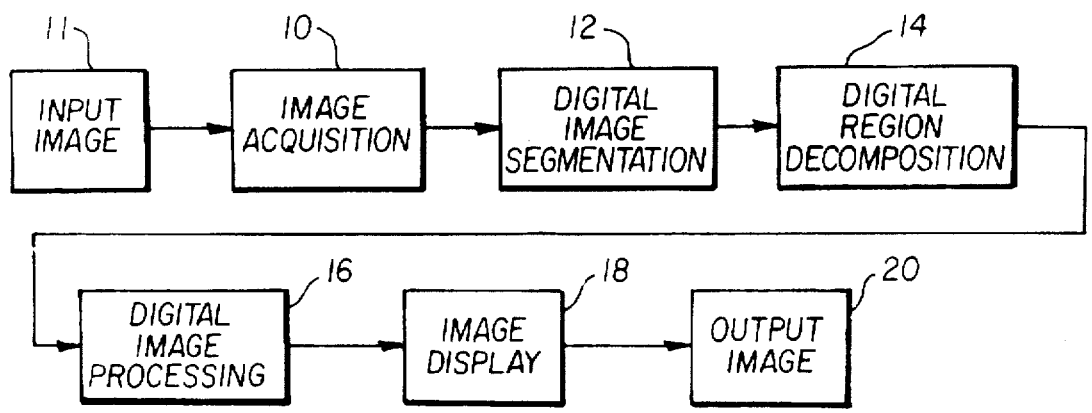
FIG. 1
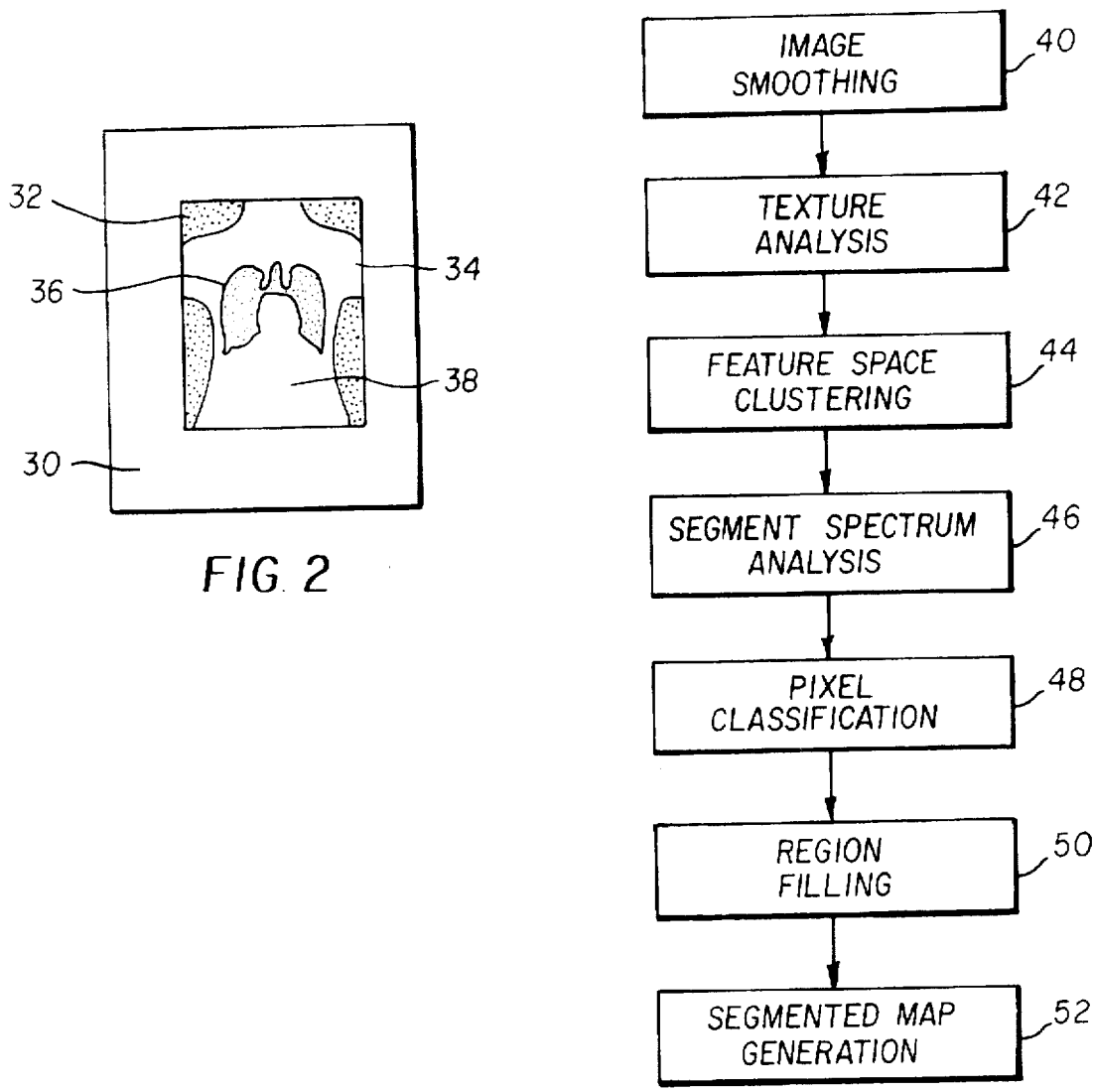
FIG. 2
FIG. 3

AUTOMATED METHOD AND SYSTEM FOR REGION DECOMPOSITION IN DIGITAL RADIOGRAPHIC IMAGES

FIELD OF THE INVENTION

The present invention relates in general to an automated method and system for digital image processing and, more specifically, to an automated method and system for decomposing regions of interest of a digital radiographic image.

BACKGROUND OF THE INVENTION

In medical imaging, accurate diagnosis of disease often depends on the detection of small, low-contrast details within the image. The probability of detection of these details, in turn, depends critically on their visibility in the image. A number of factors, including the human body being imaged, the exposure geometry and technique, and the characteristics of the detector can affect this visibility. In conventional screen/film radiography, the film functions both as a recording medium, converting light from the screen into a latent image that is rendered visible after chemical processing, and as a display medium on a viewbox. Digital radiography, however, eliminates the need for film in the image-recording step. This results in a separation of image acquisition from image display, which, in turn, allows an image or a portion of an image to be displayed at an arbitrary output contrast depending on the particular need. This can be done, for example, by creating a look-up table that maps the digital values of the acquired image into a new set of digital values that will be sent to the display device and written on some output medium. In addition, image processing techniques are often used to enhance various regions in medical images. For example, in the thoracic area of a human body (i.e., as shown in a chest x-ray), edge enhancement techniques are often used to increase the visual contrast of edges, and therefore the conspicuity of certain kinds of structures such as those associated with lung cancer and emphysema.

Another potential advantage of digital radiography is the capability for automatically recognizing anatomical regions of a human body being imaged. For example, in order to successfully recognize lungs in a chest x-ray image, one can first locate the large region covering lungs, trachea, and bronchi, and later decompose the large region into smaller and simpler subregions that can be easily recognizable.

The effectiveness of such image processing techniques depends on the careful choice of the various parameters that control their performance. Furthermore, the variety of exam types and diagnostic needs encountered in medical imaging generally requires that such parameters be chosen based on the image to be processed, rather than based on some fixed characteristics applicable to every image. For example, histogram-based tone-scale transformation is a simple and effective way of adjusting the contrast of an image. However, the histogram is a global characteristic of the image, and therefore does not render robust parameters to distinguish between, say, the low-contrast region of the body being imaged and the region corresponding to collimator blades.

Thus, it is desirable to detect and distinguish various regions of a digital radiographic image. This allows the parameters for various image processing techniques to be calculated more robustly. This in turn leads to improved quality and better depiction of the information needed for an accurate diagnosis. In the prior art, this process for isolating a region of interest is commonly called segmentation. The present invention concerns decomposing a region of interest into simpler and smaller meaningful subregions for the purposes of, for example, description and recognition. Since segmentation is a preparatory step ordinarily undertaken before decomposition, it will be described in some detail first in the background section, and later a specific implementation will be described in the description of the preferred embodiments.

Background Regarding Segmentation

Due to the importance of the information obtained from a radiographic image, prior art attempts at segmenting various regions of a digital image and further decomposing a region into subregions are known. Here image segmentation methods are aimed at partitioning an image into physically or anatomically meaningful regions based on geometric or statistical properties of the image. In contrast, region decomposition methods are aimed at dividing a region (binary shape) into simpler and smaller subregions that can be easily recognizable. From a certain point of view, region decomposition and image segmentation have the same goal of dividing an image into subimages. However, region decomposition methods focus on binary images in which all the available information is concentrated along the boundary or silhouette of the object in question.

In the description that follows, the term background is used to denote the very high intensity regions of the film, wherein unattenuated radiation energy is absorbed by the film (i.e., the area in which no body portion or object is present). Foreground will be used herein to designate the very low intensity regions of the film, wherein highly absorbent structures (e.g., collimator blades) are used to "frame" the field of irradiation on the film. The anatomical regions, for purposes of illustration only, will be the lungs and mediastinum regions of the thoracic area of the human body.

Prior art attempts at segmenting various regions of a digital image are known. For example, a method disclosed in U.S. Pat. No. 4,731,863 finds intensity thresholds between anatomical structures and image regions based on zero-crossings of a peak detection function derived from application of smoothing and differencing operators to the image histogram. According to this method, the peaks need to be interpretated for each exam type and exposure technique. That is, for one exam type or exposure technique, a low-signal peak could correspond to foreground, but (e.g., for another exam type or exposure technique) it could also correspond to a body portion if no foreground is present in the image. Correspondingly, a high-signal peak may be the image background, or it may be a high-signal body portion (e.g., lungs). Thus, some additional information may be required to complete the analysis.

In U.S. Pat. No. 4,952,805, a foreground finding technique is based on dividing the histogram into several sections with an intensity thresholding procedure. A statistical shape analysis is performed on the section believed to correspond to foreground. A decision about the presence and extent of a foreground region is made based on the shape of this section of the histogram. However, as above, the large variety of histogram shapes that can occur with different exam types and different imaging modalities (e.g., computed tomography (CT), magnetic resonance imaging (MRI), etc.) make this type of analysis subject to error. In addition, since a single threshold is chosen to represent the transition from foreground to object, this method does not perform well when the transition is fairly wide, such as when x-ray scatter is present.

Generally, histogram-based methods work best when the peaks in the histogram corresponding to the foreground/background regions are far enough away from the peaks corresponding to the anatomic regions in the body portion. If the peaks overlap, which can occur if the foreground/background are nonuniform across the image, or if scatter behind the collimator blades causes the signal level to be close to that of the highly x-ray absorbing structures in the body (e.g., the mediastinum region), then it becomes more difficult to separate the foreground/background regions from the regions inside the body portion using histogram-based methods. Moreover, using intensity as the only feature to distinguish among various regions would be expected to perform poorly. This is because anatomical regions of a medical image are often composed of coherent textures, and therefore the intensity alone does not provide sufficient information to make a robust distinction.

A more effective way of segmenting various regions is to include spatial information about the image in the analysis, in addition to the intensity information provided by the histogram. For example, a method described in U.S. Pat. No. 5,268,967 first analyzes the edge content of the image, and then breaks the image into a set of nonoverlapping, contiguous blocks of pixels. The edge density in each block is computed as one indicator of the level of detail or "busyness" in various locations of the image, and, therefore, an indicator of whether these locations are more likely to belong to the foreground, the background, or the body portion. Further analysis of the image and classification into the aforementioned three regions (i.e. background, foreground, or body portion) takes place on a block-by-block basis. More specifically, the information about edge content along with similar information from neighboring blocks is fed into a syntactic reasoning section that uses a set of clinically and empirically determined decision rules to classify each block of the image into one of the aforementioned three regions. A final refinement process is applied to evaluate the fine structure inside each block to ensure the edge pixels of the body portion being imaged are not misclassified. Although this method has proven effective in segmenting the aforementioned foreground, background, and body regions, it has more difficulty in segmenting various regions inside the body portion such as lungs and mediastinum. This happens because the edge density sometimes does not provide sufficient information, and the syntactic reasoning section assumes no region of interest inside the body portion.

Other prior art methods incorporating spatial information into their segmentation processes can be broadly classified into three categories, namely, region-based, edge-based, and pixel-based approaches [See, for example, K. S. Fu and J. K. Mui, "A survey on image segmentation," *Pattern Recognition*, vol. 13, pp. 3–16, 1981]. In a region-based approach, almost all prior art methods (e.g., region merging, region dividing, and a combination of region merging and dividing) use local information heavily. There is no simple way to incorporate global information into the segmentation process unless we severely restrict the type of images we are going to deal with. Moreover, all of the region-based prior art methods process images in an iterative manner and usually involve a great expenditure in computation time and memory. Thus, they are not often suitable for the segmentation of digital radiographic images.

In an edge-based approach, sometimes edges are detected which are not the transition from one region to another, and detected edges often have gaps in them at places where the transitions between regions are not abrupt enough. Therefore, detected edges may not necessarily form a set of connected curves that surround connected regions. As far as the applicability of the edge-based approach to digital radiography is concerned, there are often more than one type of edges (e.g., edges from clavicles, lungs, heart, etc.) inside the body portion of a digital chest radiographic image. So it is very difficult to connect detected edge elements to form closed curves because the information used to connect these edge elements may vary from different exam types. Besides, it is computationally very expensive.

In a pixel-based approach, some prior art methods assume that the distribution of intensity values or other features around a small neighborhood of any pixel can be characterized by stochastic models such as Markov and Gibbs random fields [See, for example, H. Derin and H. Elliott, "Modeling and segmentation of noisy and textured images using Gibbs random fields", *IEEE Trans. Pattern Anal. Machine Intell.*, vol. PAMI-9, no. 1, pp. 39–55, 1987]. Although these methods are mathematically attractive, it has not been proven that the regions of interest in digital radiography are truly fit by any of the existing stochastic models. Some other prior art methods (e.g., A. K. Jain and R. C. Dubes, *Algorithms for Clustering Data*, Englewood Cliffs, N.J.: Prentice Hall, 1988) compute a set of characteristic features or a feature vector for each pixel in the image. It is then expected that pixels in the same region of the image would produce feature vectors that are near to each other, whereas pixels in different regions of the image would produce feature vectors that are far apart in the feature space. A clustering method is then applied to group feature vectors in the feature space into clusters. These clusters are then mapped back to the original spatial domain to produce a segmentation of the image.

Since this approach is based on the assumption that different regions of an image are represented by distinct "modes" in the feature space, the technique will fail if this assumption is not true. Because, in general, the number of regions is not known (e.g., an image with a prosthesis and/or a cast), another drawback is that an unsupervised clustering scheme may not produce the right number of regions. Besides, intensity values and other feature values are generally image dependent and it is not clear how these other feature values should be defined in such a way as to produce good segmentation results.

Furthermore, one problem encountered by all of the aforementioned prior art methods is how to filter out noise while preserving image features, such as edges. The separation between noise and relevant information in many cases depends on the resolution or scale at which the viewer observes the image data. Thus, the problem of filtering cannot be resolved without specifying the level of descriptions desired.

Another related problem encountered by most of the aforementioned prior art methods is that image features are extracted at a single level of resolution or scale. However, an anatomical object contains features of many sizes and the object should be best described at various levels of resolution for a complete description. For example, a coarse scale is required to recognize the general shape of an object, such as the lungs, and a fine scale might be needed to recognize fine features, such as the interstitial disease of the lungs.

To remedy the scale problem, there exists a class of prior art methods that are based on coarse-to-fine resolution for improved processing efficiency and accuracy [e.g., see I. Daubechies, *Ten Lectures on Wavelets*, SIAM, 1992; and D. Marr, *Vision*, (Freeman, San Francisco, 1982)]. An image or its descriptors are represented at many levels of scale as a collective representation. Research has recently focused on the issue of how to best construct such a hierarchy of coarse-to-fine images. Representations of this type have been referred to as "pyramids", "multiresolution images", or "scale space images". However, one of the major problems is how to organize features across multiple scales for specific applications. For example, one prior art method (A. P. Witkin, "Scale-space filtering," *Proc. 8th Int. Joint Conf. Artificial Intell.*, Karlsruhe, West Germany, pp. 1019–1021, 1983) provides a basis of feature organization across multiple scales for cleaning one-dimensional (1D) noisy signals. But extending the method to two-dimensional (2D) image signals is very difficult and remains an open problem.

Background Regarding Decomposition

The present invention concerns decomposing a region of interest (a binary shape) into simpler and smaller meaningful subregions for the purposes of, say, description and recognition. It is well known to attempt decomposing a region into meaningful subregions. For example, in some prior art methods the problem is restated in terms of polygonal decomposition into convex sets, or more restrictively, into simple geometrical shapes like squares, rectangles, or circles. [See, for example, B. Schachter, "Decomposition of polygons into convex sets," *IEEE Trans. Comput.*, vol. C-27, pp. 1078–1082, Nov. 1978.] Other work has been done using the skeleton or distance transformation of a shape as a starting point. For example, in some known methods, both skeleton and contour information is explicitly used to guide decomposition into strokes and loops. [See, for example, S. K. Parui and A. Datta, "A parallel algorithm for decomposition of binary objects through skeletonization," *Pattern Recognition Letters*, vol. 12, pp. 235–240, 1991.] In another prior art method, a shape is decomposed using the information obtained by propagating distance labels into the interior of the shape.

A number of problems and limitations have been observed in the aforementioned known methods for region decomposition. First, a region can be decomposed into an arbitrary number of subregions, where the resulting decomposition depends on the number of subregions specified a priori. Intuitively, a complex region is best decomposed into subregions each exhibiting properties of a simple shape. For example, a region covering lungs is decomposed into subregions corresponding to left lung, right lung, and trachea. Decomposing a region into an excessive number of subregions often results in a fragmented representation. On the other hand, decomposing into an inadequate number of subregions often results in the inability to decompose the complex region into meaningful subregions. Therefore, choosing an appropriate number of subregions becomes essential in the decomposition process. Unfortunately, known methods generally do not address this fundamental issue. Secondly, most of the known methods decompose a region into subregions at a single level of resolution or scale. However, an anatomical region may contain features of many sizes and the decomposition should be best performed at various levels of resolution. Thirdly, all the known methods based on the skeleton or distance transformation of a region are sensitive to noise. Although the application of noise smoothing techniques is suggested prior to region decomposition, the problem of filtering out noise while preserving shape features remains unsolved. Other problems with one or more of the aforementioned methods include lack of structural information of a region in the analysis, their inability to deal with the decomposition into nonconvex subregions, and their simplicity relative to the complexity of the anatomical region to be decomposed.

Thus a need remains for an automated method and system for image processing of digital radiographic images to perform decomposition processing, wherein a binary region (shape) is partitioned into subregions. Such an automated method and system would allow the parameters of subsequent image processing techniques to be calculated more robustly, leading to better image quality and more accurate diagnosis.

SUMMARY OF THE INVENTION

An object of the present invention is to decompose a region (shape) into meaningful subregions (parts).

The foregoing problems in the prior art are solved according to the invention by an automated method for decomposing a region in a radiographic image into subregions, comprising the steps of:

(a) smoothing the region at a plurality of scales to generate a plurality of smoothed regions;

(b) at each scale, computing the number of connected components in each smoothed region;

(c) determining the most stable range of scales and the most stable number of subregions contained within the range;

(d) classifying each pixel based on the determined range of scales and the determined number of subregions; and (e) generating a decomposed map for further image processing.

The technical advantage of region decomposition according to the present invention is that it overcomes problems associated with the prior art while at the same time:

(a) incorporating structural information into the decomposition process;

(b) decomposing a region into meaningful nonconvex subregions;

(c) identifying the set of features that provides sufficient information to decompose a region of interest;

(d) determining the most stable number of decomposed subregions without a priori knowledge of noise characteristics; and (e) smoothing noise and extracting features at multiple levels of scale (resolution).

BRIEF DESCRIPTION OF THE DRAWINGS

FIG. 1 is a block diagram of an imaging system including the automated system and method of the present invention.

FIG. 2 is schematic diagram illustrating a digital radiographic image containing foreground, background, and a human body portion, wherein the body portion for illustrative purpose only is composed of lungs and mediastinum regions.

FIG. 3 is a block diagram illustrating the steps of a preferred image segmentation method useful with the present invention.

wherein the segment spectrum is used to determine the most stable range of scales and the most stable number of regions in a radiographic image.

Figure 8:
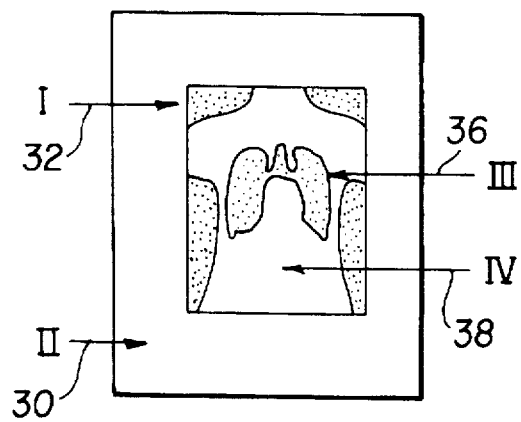

FIG. 8 is a schematic diagram illustrating the segmented map generation step of the image segmentation method.

Figure 9:
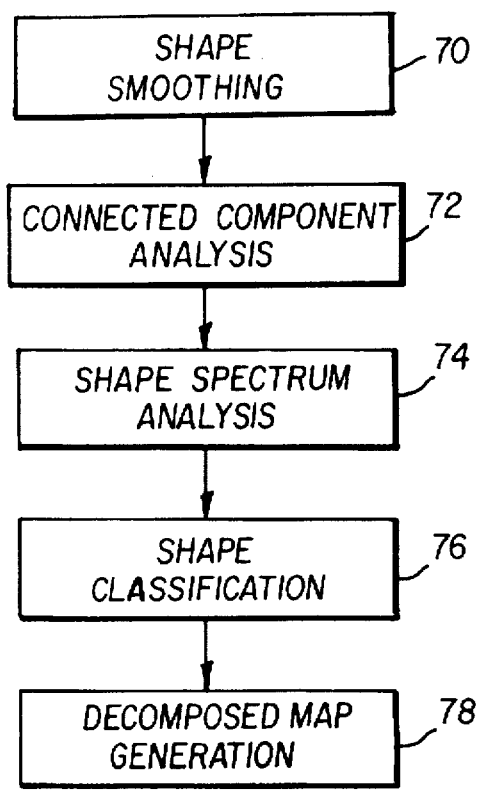

FIG. 9 is a block diagram illustrating the steps of the region decomposition method of the present invention.

Figure 10:
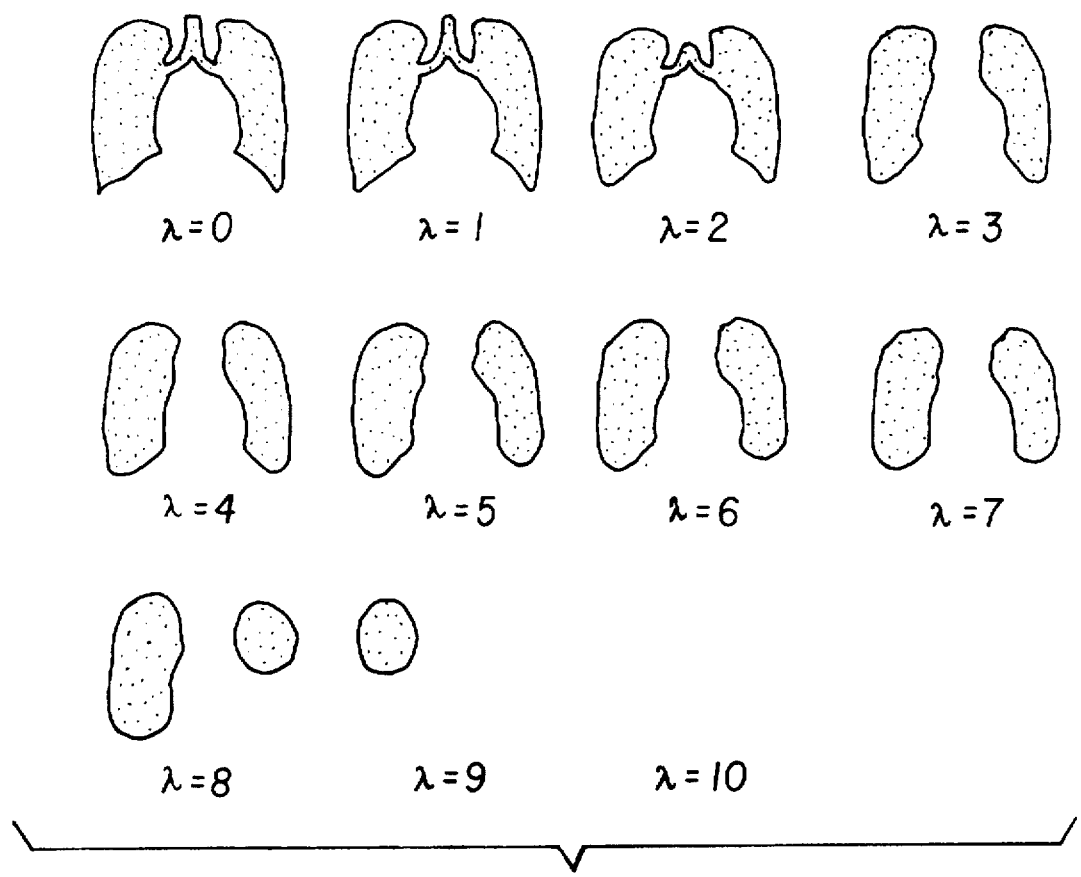

FIG. 10 is a schematic diagram illustrating a region of interest in a radiographic image being progressively smoothed by a morphological opening operation with disk structuring elements of various sizes.

Figure 11:
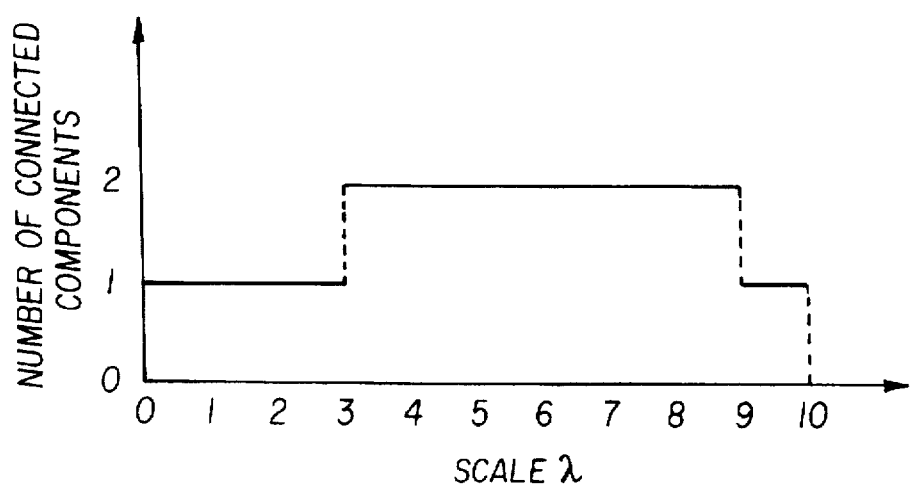

FIG. 11 is a schematic diagram illustrating the shape spectrum analysis step of the region decomposition method in the present invention, wherein the shape spectrum is used to determine the most stable range of scales and the most stable number of subregions in a radiographic region.

Figure 12:
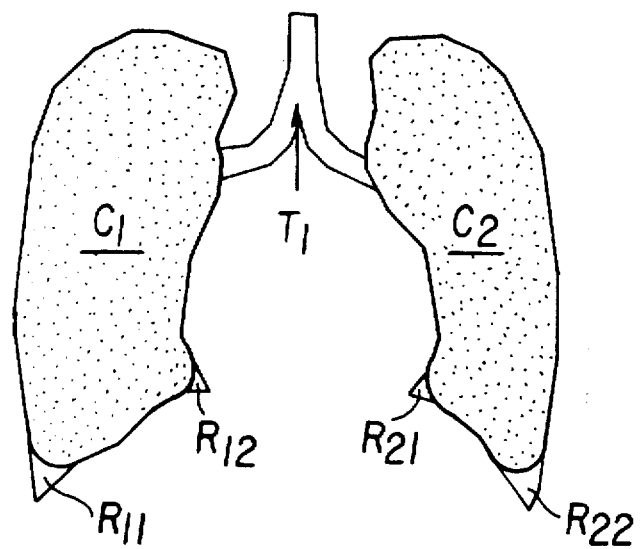

FIG. 12 is a schematic diagram illustrating the shape classification step of the region decomposition method of the present invention.

Figure 13:
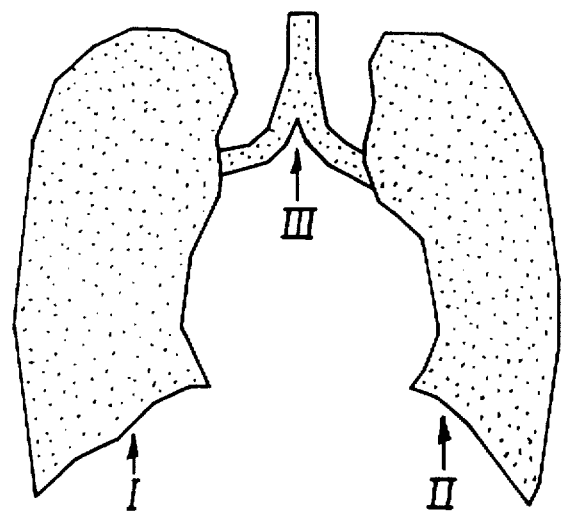
Figure 14A:
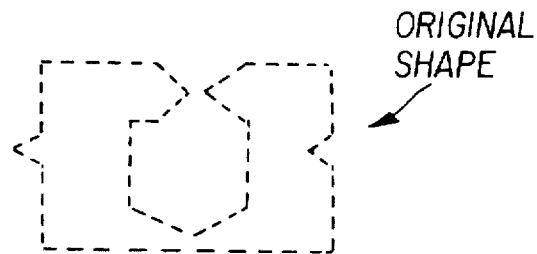
Figure 14B:
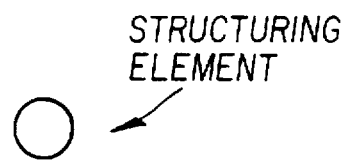
Figure 14C:
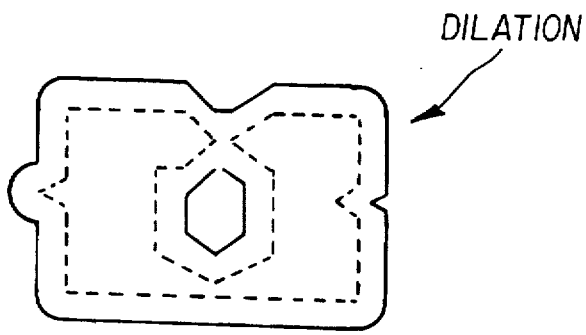
Figure 14D:
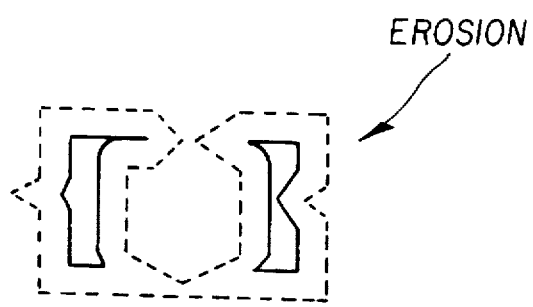
Figure 14E:
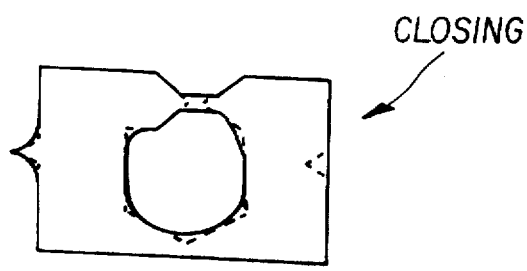
Figure 14F:
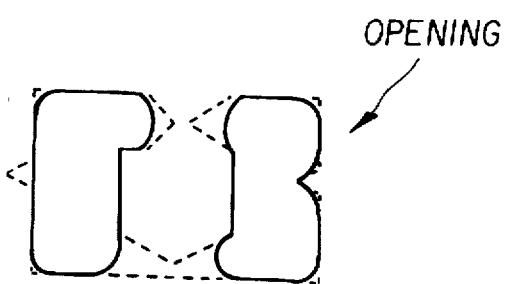

FIG. 13 is a schematic diagram illustrating the decomposed map generation step of the region decomposition method in the present invention.

FIG. 14 is a schematic diagram illustrating the morphological operations used in the image segmentation method and region decomposition method of the present invention.

DESCRIPTION OF THE PREFERRED EMBODIMENTS

Referring to FIG. 1, there is shown a block diagram of an imaging system including the automated method and system of the present invention. The imaging system comprises an image acquisition device 10 for acquiring an input image 11, a digital image segmentation processor 12, a digital region decomposition processor 14, a digital image signal processor 16, and an image display device 18 for displaying an output image 20. Although the digital image segmentation processor 12 and the digital region decomposition processor 14 of the present invention are illustrated as separate systems, they can reside within the digital image processor 16. Moreover, the digital region decomposition processor 14 can be also inserted between the digital image processor 16 and the image display device 18, as long as the input to the region decomposition processor 14 is a binary image.

The digital image signals to be processed utilizing the above-described system can be acquired in a variety of ways. For example, such images are typically derived from storage phosphor (computed radiography) systems, film digitizer systems, image intensifier systems, and the like. Additionally, images acquired via computed tomography (CT) and magnetic resonance imaging (MRI) systems can be utilized. The type of image signal processor 16 utilized in the imaging system will be dependent upon the type of digital image being processed and the ultimate use of the results of the processing. Finally, any number of display devices can be used with the imaging system. For example, the most common display devices 18 are film writers (either laser printers or cathode ray tube (CRT) printers) and CRT soft displays. Additionally, the output image 20 can be captured for permanency on photographic film. FIG. 2 shows a digital radiographic image containing a foreground 30, a background 32, and a body portion 34. The body portion, for illustrative purpose only, is composed of the regions of lungs 36 and mediastinum 38.

IMAGE SEGMENTATION

In general, as shown in FIG. 3, the digital image segmentation processor 12 performs the following steps: (1) image smoothing 40; (2) texture analysis 42; (3) feature space clustering 44; (4) segment spectrum analysis 46; (5) pixel classification 48; (6) region smoothing 50; and (7) segmented map generation 52. For purposes of illustration only, the operation of the present invention will be described with reference to the digital chest radiographic image, as shown in FIG. 2.

Image Smoothing

The first step in the image segmentation method is the step of image smoothing 40, which smooths an image using some smoothing operations. Given a 2D image f(x,y), we assume that the spatial domain of f(x,y), denoted as D, is a subset of the 2D discrete space $Z^2$. We also assume that the range of f(x,y) is a subset of the 1D discrete space Z, in which the intensity value f(x,y) varies discretely. Therefore, the digital image f(x,y) can be expressed by $$f(x,y) \in Z, (x,y) \in D \subset Z^2. \tag{1}$$

Figure 4:
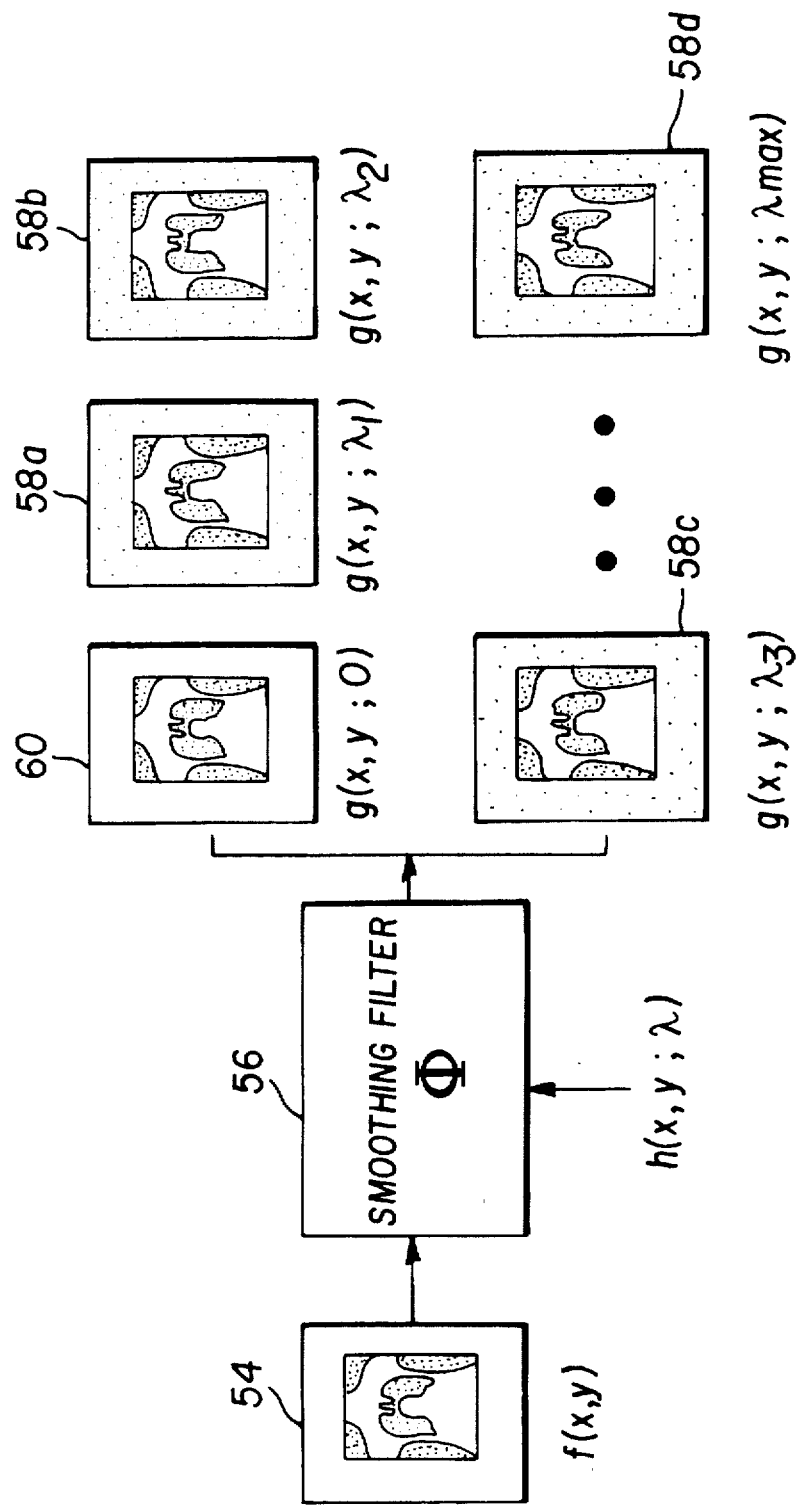
FIG. 4 is a schematic diagram illustrating a radiographic image progressively smoothed by a smoothing filter at multiple scales (resolutions).

As shown in FIG. 4, an image f(x,y) (identified as image 54) is smoothed by a family 56 of smoothing kernels h(x,y;λ) from which a set of images 58a...58d coarser than that of f(x,y) is generated. Precisely, the smoothed image at scale λ is expressed by $$g(x,y;\lambda)=\phi(f(x,y),h(x,y;\lambda)) \tag{2}$$

where $$g(x,y;\lambda) \in Z, (x,y) \in D \subset Z^2, \lambda > 0; \tag{3}$$

and the smoothed image g(x,y;λ) at λ=0 (shown as image 60 in FIG. 4) corresponds to the original image, that is, $$g(x,y;0)=f(x,y). \tag{4}$$

The amount of smoothing is determined by proper specification of λ of the smoothing kernel h(x,y;λ). In general, fine features appear in small X (high resolution) and coarse features in large X (low resolution). The stability of a feature through scale is thus viewed as the persistence to withstand smoothing.

The smoothing operation φ may be linear or nonlinear. If φ is a linear convolution, then the smoothed image can be expressed by $$g(x,y;\lambda) = f(x,y) * h(x,y;\lambda) = \int_D f(u,v)h(x-u,y-v;\lambda)dudv \tag{5}$$

where the scale variable λ varies from a small to a large value. In the preferred embodiment, the smoothing kernel h(x,y;λ) can be a Gaussian function defined by $$h_G(x,y;\lambda) = \frac{1}{2\pi\lambda^2} e^{-(x^2+y^2)/2\lambda^2} \tag{6}$$

or a so-called Mexican hat function defined by $$h_M(x,y;\lambda) = \frac{1}{\lambda} \left(1-\left(\frac{x}{\lambda}\right)^2\right)\left(1-\left(\frac{y}{\lambda}\right)^2\right) e^{-(x^2+y^2)/2\lambda^2} \tag{7}$$

with λ ranging from 0 to $\lambda_{max}$, the width of the discrete image domain D. It is to be noted that if the smoothing kernel is a Mexican hat function, then the smoothing operation φ becomes the wavelet transform (I. Daubechies, *Ten Lectures on Wavelets*, SIAM, 1992). Other well-known non-linear operations such as median filters, rank-order filters, stack filters, and morphological filters may be applicable in this step. In addition, anisotropic diffusion filters (P. Perona and J. Malik, "Scale-space and edge detection using anisotropic diffusion," *IEEE Trans. Pattern Anal. Machine Intell.*, vol. PAMI-12, pp. 629–639, 1990) may also be applicable in this step.

Texture Analysis

Figure 5:
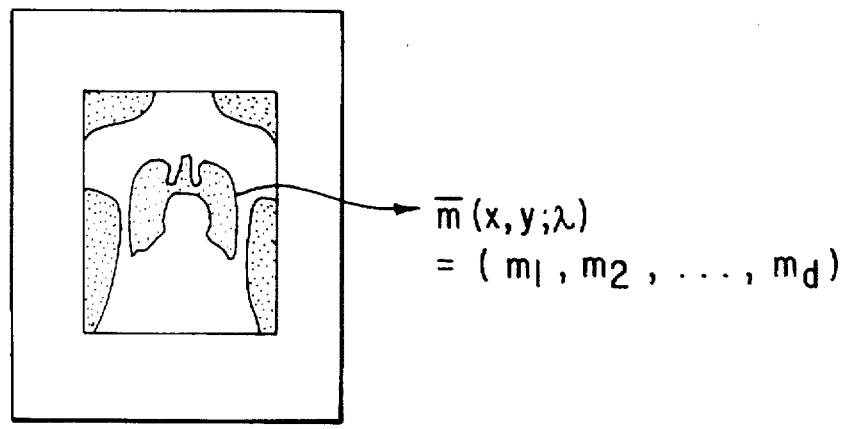
FIG. 5 is a schematic diagram illustrating the texture analysis step of the image segmentation method.

The next step in the image segmentation method is the step of texture analysis 42 of the smoothed images $g(x,y;\lambda)$ at multiple scales. The objective is to compute a set of texture measures or a texture vector for each pixel in the smoothed images. Although using intensity values alone may segment some types of regions in digital radiographic images, it does not provide acceptable segmentation results in general. Besides, in medical imaging, pixels which are spatially close are likely to be of the same texture except for those around edges. Therefore, an intuitive approach is to calculate a set of texture measures or a texture vector at each pixel of the smoothed image. As shown in FIG. 5, the texture vector $\overline{m}(x,y;\lambda)$ is composed of d texture measures computed at the pixel (x,y) of the smoothed image at the scale $\lambda$. This would be able to increase the level of information extracted from images and to also quantify region differences inaccessible to intensity value.

As there have been many texture measures available, it is important to choose a small number of d such that the optimal segmentation result can be obtained in the sense of segmentation correctness and efficiency. For the image segmentation method disclosed in the present invention, it is experimentally shown that the set of eight texture measures, $M=\{m_i, 1<i<8\}$ as listed in Appendix 2, provides the optimal segmentation results for digital radiographic images. Moreover, if the exam type of the input image is given a priori, one could further reduce the number of texture measures to achieve the same quality of segmentation results.

Feature Space Clustering

Figure 6:
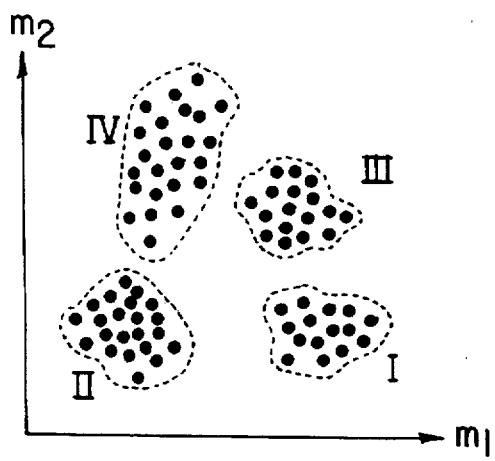
FIG. 6 is a schematic diagram illustrating the feature space clustering step of the image segmentation method.

The next step in the image segmentation method is the step of feature space clustering 44. The feature space is constituted by a d-dimensional (d=8) space in which each pixel in the smoothed image $g(x,y;\lambda)$ is represented by a texture vector $\overline{m}(x,y;\lambda)=(m_1(x,y;\lambda), m_2(x,y;\lambda), \ldots, m_8(x,y;\lambda))$. Here $(m_i(x,y;\lambda))$ is the with texture measure computed for the pixel (x,y) at the scale $\lambda$. If all the pixels in one spatial region had the same texture measures, there would be only a single point observed in the feature space. In real cases it is expected that all the pixels in one spatial region form a cluster of points in the feature space. The clustering problem is then to find separating surfaces in d dimensions which will partition the feature space into $K(\lambda)$ mutually exclusive regions. Many supervised clustering algorithms are available and effective when the number of clusters into which a data set should be classified is known. However, in reality, the number of clusters to be obtained is not known or cannot be certain in advance. While other known unsupervised algorithms may be used, in the preferred embodiment an unsupervised algorithm described in Hattori (K. Hattori and Y. Torii, "Effective algorithms for nearest neighbor method in the clustering problem," *Pattern Recognition*, vol. 26, no. 5, pp. 741–746, 1993), which does not need the number of clusters a priori, is applied. In the Hattori paper, this algorithm is described as the second of two effective algorithms for the nearest neighbor method, which is one of the typical hierarchical agglomerative clustering methods. This algorithm yields several probable solutions of the clustering problem in which the number of clusters to be obtained is not known in advance. This algorithm has been tested in the present embodiment and confirmed to be effective in clustering the feature space for digital radiographic images. For illustrative purpose only, FIG. 6 gives an example of 2D feature space $(m_1,m_2)$ in which four clusters are separated for the smoothed image $g(x,y;\lambda)$ shown in FIG. 5. It is to be noted that the number of clusters is dependent upon the scale $\lambda$ at which we observe the data. Moreover, we can further remove features not contributing to good clustering and hence reduce the dimensionality for clustering the feature space.

Segment Spectrum Analysis

The number of clusters computed at the previous step often varies at different scales. For example, the number of clusters increases as the scale is decreased since much more detailed information including noise can be observed at finer scales (higher resolutions). The following step in the image segmentation method is the step of segment spectrum analysis 46, from which we determine the most stable number of regions (i.e., segments in a radiographic image) and the most stable range of scales to segment an image. The number of clusters, as computed at each scale from the previous step, is used to construct the segment spectrum—the number of clusters in the feature space as a function of scale. With discrete increment of $\lambda$, the segment spectrum is a discrete function where the most frequent count is determined by a continuum of the broadest constant spectrum. Mathematically, the most frequent count, $N^*$, is expressed as $$N^* = \arg_{N \in Z^+} \max \; \{\lambda''_N - \lambda'_N K(\lambda) = N, \text{ for } \lambda'_N \leq \lambda \leq \lambda''_N\} \tag{8}$$

where $Z^+$ is the set of positive integers, and $\lambda'_N$ and $\lambda''_N$ denote the range of a constant spectrum, that is, the range of scales in which the number of clusters is equal to N. The chest radiographic image in FIG. 2 is used to construct the segment spectrum shown in FIG. 7, where the most stable scales ranges from $\lambda'_{N*}=32$ to $\lambda''_{N*}=75$; and the most stable number of regions $N^*$ is found to be equal to 4, which is the most frequent cluster count ($N^*=4$) represented by the continuum of the broadest constant spectrum.

Pixel Classification

The next step is the step of pixel classification 48. After progressive smoothing and texture analysis up to the scale $\lambda'_{N*}$, the image f(x,y) is detected to have $N^*$ stable regions, where $\lambda'_{N*}$ is the lower bound of the bandwidth that spans the broadest constant spectrum $[\lambda'_{N*}, \lambda''_{N*}]$. The lower bound is chosen because within the bandwidth, $g(x,y;\lambda'_{N*})$ is the closest to f(x,y) in the sense of minimum mean square error. Therefore, a pixel in the spatial domain is classified into the kth ($1<k<K(\lambda'_{N*})$) region when its associated texture vector $\overline{m}(x,y;\lambda'_{N*})$ belongs to the kth cluster obtained from the step of feature space clustering.

Region Filling

Ideally, there is no hole inside any anatomical region derived from the previous step. However, due to the possible distribution of irregular textures in a region (e.g., diseases in the region of lungs) and the imperfectness of feature space clustering, there may exist small holes in the segmented regions derived from the previous step. Therefore, the next step of the image segmentation method is region filling in which holes are filled in for the above segmented regions. A simple and efficient algorithm use d to implement this step is provided in Appendix 3.

Segmented Map generation

Figure 7:
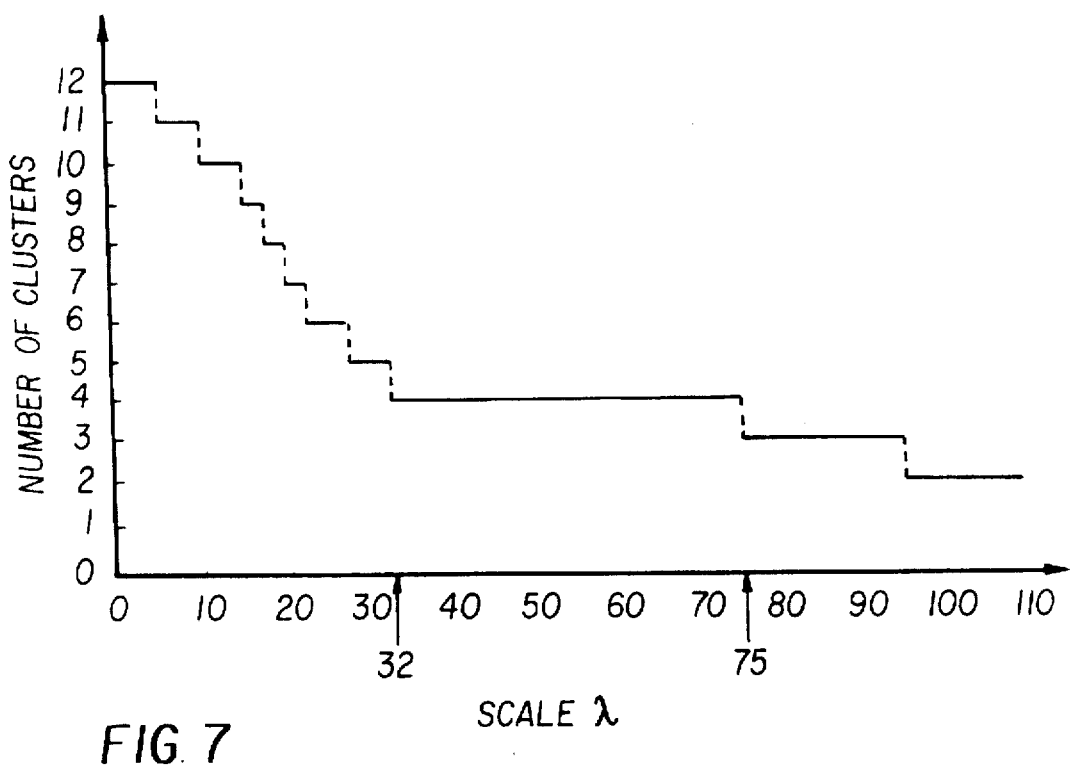
FIG. 7 is a schematic diagram illustrating the segment spectrum analysis step of the image segmentation method.

In the last step of the method, the segmented map generation step 52, an \N*-valued image is generated that functions as N* templates for any further image processing to be done on various regions of the image. FIG. 8 illustrates an example where the input image as shown in FIG. 2 is segmented into the most stable four regions I–IV; namely, the background 32, the foreground 30, the lungs 36, and the mediastinum 38, where the regions I–IV correspond to the clusters I–IV shown in FIG. 6 (in feature space) for the feature continuum of broadest constant spectrum (FIG. 7). As a result, if a histogram of the lung region is required, only those pixels with the correct value in the N*-valued image are included in the calculation. If edge enhancement is being performed, pixels in the undesired regions (e.g., foreground/background) are not included in the calculation of enhancement parameters. In this way, only the relevant information in the image is included in subsequent image processing of the image, leading to images with high quality and high diagnostic utility.

REGION DECOMPOSITION

The object of the present invention is to further decompose a region of interest (denoted by S hereafter) into meaningful subregions (parts). In general, as shown in FIG. 9, the region decomposition method of the present invention includes the following steps: (1) a shape smoothing step 70; (2) a connected component analysis step 72; (3) shape spectrum analysis step 74; (4) shape classification step 76; and (5) a decomposed map generation step 78. For purposes of illustration only, the operation of the present invention will be described with reference to the region of lungs, as shown in several scales in FIG. 10.

Shape Smoothing

The first step in the region decomposition method is to smooth a region (shape) at multiple scales. Similar to the progressively smoothing techniques used in the image segmentation method, the stability of a region through scale is viewed as the persistence to withstand smoothing in the region decomposition method. Based on this stability idea, a shape S is progressively smoothed by a morphological opening operation with disk structuring elements of various sizes. A brief discussion of morphological operations is given in Appendix 1. FIG. 10 illustrates an example where the region of lungs is progressively smoothed by morphological opening with disk structuring elements of various sizes from the finest scale $\lambda=0$ to $\lambda=10$ at which the region S completely vanishes.

Connected Component Analysis

The morphological opening operation may cause a single region to be broken into a number of connected components, as shown in FIG. 10. The next step in the region decomposition method is to measure the number of connected components at each scale. Notice the change from one connected component to two connected components at $\lambda=3$, then to one connected component at $\lambda=9$, and finally to zero in FIG. 10.

A simple and efficient algorithm used to compute the number of connected components of a region is provided in the Appendix 4.

Shape Spectrum Analysis

Next, we propose to construct a shape spectrum—the number of connected components as a function of scale, for the determination of the most stable region decomposition. FIG. 11 illustrates an example where the most frequent count N*=2 is determined by a continuum of the broadest constant spectrum. Mathematically, the most frequent count, N*=2 is expressed as $$N^* = \arg \max_{N \in Z^+} \{\lambda''_N - \lambda'_N | CN[S \circ B(\lambda)] = N, \text{ for } \lambda'_N \leq \lambda \leq \lambda''_N\} \quad (9)$$

where $Z^+$ is the set of positive integers, $CN[\bullet]$ denotes the number of connected components, and $\lambda'_N$ and $\lambda''_N$ denote the range of a constant spectrum, that is, the range of scales in which the number of connected components is equal to N. Subsequently, the most frequent count N* will be used to determine the most stable decomposition of S.

Shape Classification

After progressive smoothing up to the scale $\lambda'_{N^*}$ the region S degenerates into N* connected components and the smoothed region S' is given by $$S' = S \circ B(\lambda'_{N^*}) = \bigcup_{1 \leq i \leq N^*} C_i \quad (10)$$

where $C_i$ denotes the $i^{th}$ connected component. Note that $\lambda'_{N^*}$ is the lower bound of the bandwidth that spans the broadest constant spectrum $[\lambda'_{N^*}, \lambda''_{N^*}]$. The lower bound is chosen because within the bandwidth, S' at $\lambda'_{N^*}$ is the closest approximation to S. A simple and efficient algorithm used to compute $C_i$ can be easily derived and is provided in the Appendix 5.

Morphological smoothing removes boundary details from S and these details are the residual given by $$S = S \setminus S' \quad (11)$$

which consists of features such as corners and protrusions. These features are classified into two sets—single-connected and multiple-connected. Let $R_i$ be the single-connected set which consists of $J_i$ features, each connected to only the connected component $C_i$ of S'. It is to be noted that a part is said to be connected to a connected component if it is 8-connected to the component. The single-connected set is given by $$R_i = \bigcup_{1 \leq j \leq J_i} R_{ij} \quad (12)$$

where $R_{ij}$ is the $\j^{th}$ feature connected to $C_i$. In addition, let T be the multiple-connected set which consists of K features each connected to two or more connected components of S'. The multiple-connected set is given by $$T = \bigcup_{1 \leq k \leq K} T_k \quad (13)$$

where $T_k$ represents the $k^{th}$ feature of the set. A simple and efficient algorithm used to compute $J_i$, K, $R_{ij}$, and $T_k$, is provided in the Appendix 6.

FIG. 12 shows an example where the connected components $C_1$ and $C_2$, and the features $R_{i,j}$ and $T_k$ are derived from the shape in FIG. 10 with $\lambda=0$.

The region S can now be decomposed into nonoverlapping subregions (parts) using the various parts $C_i$ generated at the scale $\lambda'_{N^*}$, plus the residual $\bar{S} = \{(R_i \cdot T\}$. The following describes the process. Single-connected features in $R_i$ are combined with $C_i$ to form the $i^{th}$ part of S. After all the i connected components are joined together with their respective features, a total of N* parts are obtained with all their details intact. Furthermore, each multiple-connected feature in T is considered to be an additional part of S. Consequently, S is completely partitioned into N*+K nonoverlapping subregions. This partition is considered to be the most stable decomposition and is given by $$S = \bigcup_{1 \leq i \leq N^*} (C_i \cup R_i) \cup \bigcup_{1 \leq k \leq K} T_k \quad (14)$$

Decomposed Map Generation

In the last step of the method, the shape classification result is subsequently used to create a (N*+K)-valued image that functions as (N*+K) templates for any further image processing to be done on various subregions. For example, if a histogram of the left lung subregion is required, only those pixels with the correct value in the (N*+K) -valued image are included in the calculation. In this way, only the relevant information in the image is included in subsequent image processing of the image, leading to images with high quality and high diagnostic utility. FIG. 13 illustrates an example where the region of lungs is decomposed into the most stable three subregions; namely, right lung I, left lung II, and trachea III.

The image segmentation method and region decomposition method of the present invention have been tested on a large set of clinical data (more than 1000 images) obtained from a digital radiographic system; namely, KODAK EKTASCAN IMAGELINK Critical Care System (KEICCS) in which a storage phosphor reader is used as the image acquisition device. The original images were acquired at a resolution of 2048 pixels/line and 2500 lines and 12 bits/pixel. In order to make the image segmentation method and region decomposition method of the present invention more efficient, the images were subsampled by a factor of 9 in both directions, resulting in images 227 pixels by 277 pixels in size. The image size of the subsampled image chosen for the preferred embodiment of the present invention was based on a series of tests with image sizes ranging from full resolution (2048×2500) to 64×78. The quality of the results was not affected by image size until the smallest sizes were reached (subsampling factors greater than approximately 16).

Although a preferred embodiment of the present invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

Appendix 1: Definitions and Notations of Mathematical Morphology

We follow the general terminology and notations as in Haralick (R. M. Haralick, S. R. Sternberg, and X. Zhuang, "Image analysis using mathematical morphology," *IEEE Trans. Pattern Anal. Machine Intell.*, vol. PAMI-9, no. 4, pp. 532–550, 1987) to define the basic morphological operators used for the description of the preferred embodiment.

Definition 1: The erosion of the region S by the structuring elements B is defined by $$S \phi B = \bigcap_{b \in B} S_{-b} \quad (15)$$

where $S_{-b}$ is the translation of the image S by $-b$.

Definition 2: The dilation of the region S by the structuring elements B is defined by $$S \oplus B = \bigcup_{b \in B} S_{+b} \quad (16)$$

Definition 3: The opening of the region S by the structuring elements B is defined by $$S \circ B = (S \ominus B) \oplus B \quad (17)$$

Definition 4: The closing of the region S by the template B is defined by $$S \cdot B = (S \oplus B) \ominus B \quad (18)$$

It can be seen from FIG. 14 that erosion shrinks the pattern, whereas dilation expands the pattern. Opening suppresses sharp protrusions and eliminates narrow passages, whereas closing fills in gaps and small holes.

Appendix 2: Texture Measures

In our study on the texture analysis of digital radiographic images, the following eight texture measures are observed to be effective in classifying various regions of interest. These measures are computed over a well-defined region R of the input image $f(x,y), (x,y) \in D$ with R being a subset of D. In the preferred embodiment of the present invention, R is a 51×51 square region for a full resolution image, and 5×5 for a subsampled image. Of course, the region R can be also defined as a function of scale that we use to observe the data. For example, $$R(\lambda) = 5 + \lambda \left( \frac{51 - 5}{\lambda_{max}} \right). \quad (19)$$

To formulate the measures in a concise way, we denote the number of pixels and the maximal intensity value in R by $N_R$ and $G_R$, respectively. We further define $$p(i) = \frac{1}{N_R} \cdot \text{(Number of pixels with} \quad (20)$$

$$f(x,y) = i, (x,y) \in R)$$

$$p(i,j) = \frac{1}{N_R} \cdot \text{(Number of pixels with} \quad (21)$$

$$f(x_1,y_1) = i, f(x_2,y_2) = j, (x_1,y_1),(x_2,y_2) \in R)$$

and $$p'(i) = \frac{1}{N_{R2}} \cdot \text{(Number of pixels with} \quad (22)$$

$$|f(x_1,y_1) - f(x_2,y_2)| = i, (x_1,y_1),(x_2,y_2) \in R),$$

-continued where $$\sum_{i=0}^{G_R} p(i) = 1, \sum_{i=0}^{G_R}\sum_{j=0}^{G_R} p(i,j) = 1, \sum_{i=0}^{G_R} p'(i) = 1. \quad (23)$$

Then the eight texture measures are defined in the following:

$$m_1 = \sum_{i=0}^{G_R} i \cdot p(i), \quad (24)$$

$$m_2 = \sum_{i=0}^{G_R} i^2 \cdot p(i) - m_1^2, \quad (25)$$

$$m_3 = \sum_{i=0}^{G_R}\sum_{j=0}^{G_R} p(i,j)^2, \quad (26)$$

$$m_4 = \sum_{i=0}^{G_R}\sum_{j=0}^{G_R} (-p(i,j) \cdot \log p(i,j)), \quad (27)$$

$$m_5 = \sum_{i=0}^{G_R}\sum_{j=0}^{G_R} \frac{1}{1+(k-l)^2} \cdot p(i,j), \quad (28)$$

$$m_6 = \sum_{i=0}^{G_R} i \cdot p'(i), \quad (29)$$

$$m_7 = \sum_{i=0}^{G_R} i^2 \cdot p'(i), \quad (30)$$

$$m_8 = \sum_{i=0}^{G_R} (-p'(i) \cdot \log p'(i)). \quad (31)$$

Appendix 3

An Algorithm to Fill Holes inside a Region

INPUT: (S)

OUTPUT: (S')

Step 1: Set G to be a set containing pixels of the first row, the first column, the last row, and the last column of the input image; Set H to be $S^c$ (the set complement of S); set A to be a 3×3 square structuring element Step 2: If H\G=∅, then S':=$H^c$; STOP, otherwise Step 3: Arbitrarily select a pixel x∈H\G; set E:={x}

Step 4: D:=(E⊕A)∩H

Step 5: If D=E and D∩G=∅ then H=H\D; repeat from Step 2, otherwise

Step 6: If D=E and D∩G≠∅, then G=G∪D; repeat from Step 2, otherwise

Step 7: E:=D; repeat from Step 4.

Appendix 4

An Algorithm to Compute the Number of Connected Components

INPUT: {S}

OUTPUT: {N}

Step 1: Set N to 0; set A to be a 3×3 square structuring element

Step 2: If S=∅, then STOP, otherwise

Step 3: Arbitrarily select a pixel x∈S; set E:={x}

Step 4: D:=(E⊕A)∩S

Step 5: If D=E, then S:=S\D; set N to N+1; repeat from Step 2, otherwise

Step 6: E:=D; repeat from Step 4.

Appendix 5

An Algorithm to Compute $C_i$

INPUT: {S, N*, $r'_{N*}$}

OUTPUT: {$C_1, C_2, \ldots, C_{N*}$}

Step 1: Set i to 1; set $\Pi_i(S):=S \supset B(r'_{N*})$ where $B(r'_{N*})$ is a disk structuring element of size $r'_{N*}$; set A to be a 3×3 square structuring element Step 2: Arbitrarily select a pixel x ∈ $\Pi_i(S)$; set E:={x}

Step 3: D:=(E⊕A)∩$\Pi_i(S)$

Step 4: If D=E, then $C_i$:=D; go to Step 6, otherwise

Step 5: E:=D; repeat from Step 3

Step 6: If i=N*, then STOP, otherwise

Step 7: Set i to i+1; $\Pi_i(S):=\Pi_{i-1}(S)\backslash C_{i-1}$; repeat from Step 2.

Appendix 6

An Algorithm to Computer $J_i$, K, $R_{ij}$, and $T_k$

INPUT: {S, N*, $C_1, C_2, \ldots, C_{N*}$}

OUTPUT: {$J_1, J_2, \ldots, J_{N*}$, K, $R_{11}, R_{12}, \ldots, R_{1J_1}, R_{21}, \ldots, R_{N*J_{N*}}, T_1, T_2, \ldots, T_K$}

Step 1: Set n to 1; set $\Gamma_n(S) := S\backslash U_{1 \leq i \leq N*} C_i$; set A to be a 3×3 square structuring element Step 2: Arbitrarily select a pixel x ∈$\Gamma_n(S)$; set E:={x}

Step 3: D:=(E⊕A)∩$\Gamma_n(S)$

Step 4: If D=E, then $P_n$:=D; go to Step 6, otherwise

Step 5: E:=D; repeat from Step 3

Step 6: Set n to n+1; $\Gamma_n(S):=\Gamma_{n-1}(S)\backslash P_{n-1}$;

Step 7: If $\Gamma_n(S) \neq \emptyset$, repeat from Step 2, otherwise

Step 8: For i from 1 to N*, set $J_i$ to 0; set K to 0; for m from 1 to n−1, repeat from Step 9 to Step 10

Step 9: If $(P_m \oplus A) \cap C_i \neq \emptyset$ for only one i in [1, N*], then set $J_i$ to $J_i$+1; $R_{iJ_i}$:=$P_m$, otherwise Step 10: Set K to K+1; $T_K$:=$P_m$.

| PARTS LIST | |
|---|---|
| 10 | image acquisition device |
| 11 | input image |
| 12 | digital image segmentation processor |
| 14 | digital region decomposition processor |
| 16 | digital image signal processor |
| 18 | image display device |
| 20 | output image |
| 30 | foreground |
| 32 | background |
| 34 | body portion |
| 36 | lungs |
| 38 | mediastinum |
| 40 | image smoothing |
| 42 | texture analysis |
| 44 | feature space clustering |
| 46 | spectrum segment analysis |
| 48 | pixel classification |
| 50 | region smoothing |
| 52 | segmented map generation |

-continued

PARTS LIST

| | |
|---|---|
| 54 | image f(x,y) |
| 56 | family of smoothing kernels |
| 58a | coarser images |
| . | |
| . | |
| . | |
| 58d | |
| 60 | image f(x,y) at λ = 0 |
| 70 | shape smoothing |
| 72 | connected component analysis |
| 74 | shape spectrum analysis |
| 76 | shape classification |
| 78 | decomposed map generation |

What is claimed is:

1. An automated method for decomposing a region in a radiographic image into subregions, comprising the steps of:
   (a) smoothing the region at a plurality of scales to generate a plurality of smoothed regions;
   (b) computing, at each scale from each smoothed region, the number of connected components in each smoothed region;
   (c) determining the most stable range of scales and the most stable number of subregions contained within the range;
   (d) classifying each pixel based on the determined range of scales and the determined number of subregions; and
   (e) generating a decomposed map for further image processing.

2. The method of claim 1 wherein the subregions are physically or anatomically meaningful subregions.

3. The method of claim 1 wherein the step of smoothing a region at a plurality of scales includes the use of one or more morphological smoothing techniques.

4. The method of claim 1 wherein the step of determining the most stable range of scales comprises the step of constructing a shape spectrum by the number of connected components as a function of scale.

5. The method of claim 4 wherein the step of determining the most stable number of subregions comprises determining the span of a continuum of the broadest constant spectrum.

6. The method of claim 4 wherein the step of determining the most stable range of scales comprises determining the range of the broadest constant spectrum.

7. The method of claim 4 wherein the step of classifying each pixel includes the use of a lower bound of the broadest constant spectrum.

8. The method of claim 1 wherein the step of generating a decomposed map includes the use of a multiple-valued image that functions as multiple templates for any further image processing to be done on the various decomposed subregions of the image.

9. A system for decomposing a region in a radiographic image into subregions, comprising:
   (a) means for smoothing the region at a plurality of scales to generate a plurality of smoothed regions;
   (b) means for computing, at each scale from each smoothed region, the number of connected components in each smoothed region;
   (c) means for determining the most stable range of scales and the most stable number of subregions contained within the range;
   (d) means for classifying each pixel based on the determined range of scales and the determined number of subregions; and
   (e) means for generating a decomposed map for further image processing.

10. The apparatus of claim 9 wherein said means for smoothing a region at a plurality of scales includes one or more morphological smoothing techniques.

11. The apparatus of claim 9 wherein said means for determining the most stable range of scales and the most stable number of subregions comprises means for constructing a shape spectrum by the number of connected components as a function of scale.

12. The apparatus of claim 11 wherein said means for constructing a shape spectrum to determine the most stable number of subregions further includes means for determining the span of a continuum of the broadest constant spectrum.

13. The apparatus of claim 9 wherein said means for generating a decomposed map includes the generation of a multiple-valued image that functions as multiple templates for any further image processing to be done on the various decomposed subregions of the image.

14. The apparatus of claim 9 wherein the image is a subsampled image.

15. The apparatus of claim 9 wherein the image is a non-subsampled image.

* * * * *

UNITED STATES PATENT AND TRADEMARK OFFICE
CERTIFICATE OF CORRECTION

PATENT NO. : 5,757,953
DATED : May 26, 1998
INVENTOR(S) : Ben K. Jang

It is certified that error appears in the above-indentified patent and that said Letters Patent is hereby corrected as shown below:

Column 12, line 43 $\quad -- \bar{S} = S \backslash S' --$

Col. 14, line 8 $\quad -- S \ominus B = \bigcap_{b \in B} S_{-b} --$

Col. 14, line 16 $\quad -- S \oplus B = \bigcup_{b \in B} S_{+b} --$

Signed and Sealed this

Twenty-fifth Day of August, 1998

Attest:

BRUCE LEHMAN

*Attesting Officer*     *Commissioner of Patents and Trademarks*